UNITED STATES PATENT OFFICE.

JULIUS H. TIEMANN, OF BROOKLYN, NEW YORK.

PROCESS OF PURIFYING PETROLEUM.

SPECIFICATION forming part of Letters Patent No. 330,637, dated November 17, 1885.

Application filed October 6, 1885. Serial No. 179,132. (No specimens.)

*To all whom it may concern:*

Be it known that I, JULIUS H. TIEMANN, a citizen of the United States, residing at Brooklyn, in the county of Kings and State of New York, have invented certain new and useful Improvements in Processes of Purifying Petroleum; and I do hereby declare the following to be a full, clear, and exact description of the invention, such as will enable others skilled in the art to which it appertains to make and use the same.

My invention relates to the purification of petroleum or rock oil. In the treatment of petroleum for the manufacture of lubricating or burning oils, or of the lighter products, it is customary, in order partly or wholly to remove the heavy hydrocarbons and other impurities, to mix and agitate with it in a suitable vessel a certain per cent. of sulphuric acid or similar agent.

The objects of my present invention are to render more effective and complete the action of the sulphuric acid or similar agent, and to hasten the same, and also to reduce the percentage of such acid usually employed.

The invention consists, broadly stated, in diffusing or spreading the acid throughout the oil or distillate to be treated by means of a substance, preferably a solid, and comminuted, granulated, or in the form of powder, which is not soluble in or chemically affected by the acid or similar agent.

To carry my invention into effect, I proceed as follows: To any of the distillates of petroleum, (including gasoline, benzine, naphtha, burning-oils, or the heavier lubricating and paraffine oils,) in an agitator or other suitable vessel, I add a dry powder consisting, preferably, of clay, ground silica, (sand) or ground glass, or any similar material which is not soluble in or chemically affected by sulphuric acid. After a thorough agitation I gradually add the requisite amount of sulphuric acid, continuing the agitation from one-quarter to one-half hour. The amount of dry powder to be used depends upon the amount of sulphuric acid. I find in practice that about two pounds of the powder to one pound of the acid produces the most satisfactory results. After settling, the oil can then be washed and treated with alkali, as in the usual method. By this treatment the acid, being spread over the powder, presents a larger surface to the oil, and is brought into more intimate contact with it than in the old method, less acid is required, and after the agitation the particles of tarry matter precipitated or separated by the action of the acid attach themselves to the particles of the powder, and consequently settle much more rapidly than where acid alone is used, thus saving much time and expense.

I have thus described what may be deemed the preferable mode of procedure to carry my invention into effect; but I wish it understood that I may in some cases mix a suitable quantity of acid with the insoluble substance and then disseminate this mixture throughout the oil to be treated by sifting or dredging it upon the oil or by agitation therewith.

Having thus described my invention and the method of carrying the same into effect, what I claim, and desire to secure by Letters Patent, is—

1. In refining petroleum, the method of effecting more immediate and intimate contact of the acid, which consists in diffusing or spreading the acid by mixing with the petroleum and acid a powdered silicious or other inorganic substance of greater specific gravity than the oil, and which is insoluble in or unaffected chemically by the acid, as set forth.

2. In refining petroleum, the method of effecting more immediate and intimate contact of the acid therewith, which consists in mixing with the petroleum a powdered silicious or similar inorganic substance of greater specific gravity than the oil, and which is insoluble in or unaffected chemically by the acid, and then adding the acid and agitating the mixture, substantially as set forth.

In testimony whereof I affix my signature in presence of two witnesses.

JULIUS H. TIEMANN.

Witnesses:
R. G. DYRENFORTH,
W. W. MORTIMER.